Dec. 23, 1952     H. C. GRAEBE     2,622,280
PNEUMATIC LINTER GIN

Filed Dec. 23, 1949     3 Sheets-Sheet 1

Inventor
Herman C. Graebe
by Roberts Cushman & Grover
Att'ys.

Dec. 23, 1952
H. C. GRAEBE
2,622,280
PNEUMATIC LINTER GIN
Filed Dec. 23, 1949
3 Sheets-Sheet 2
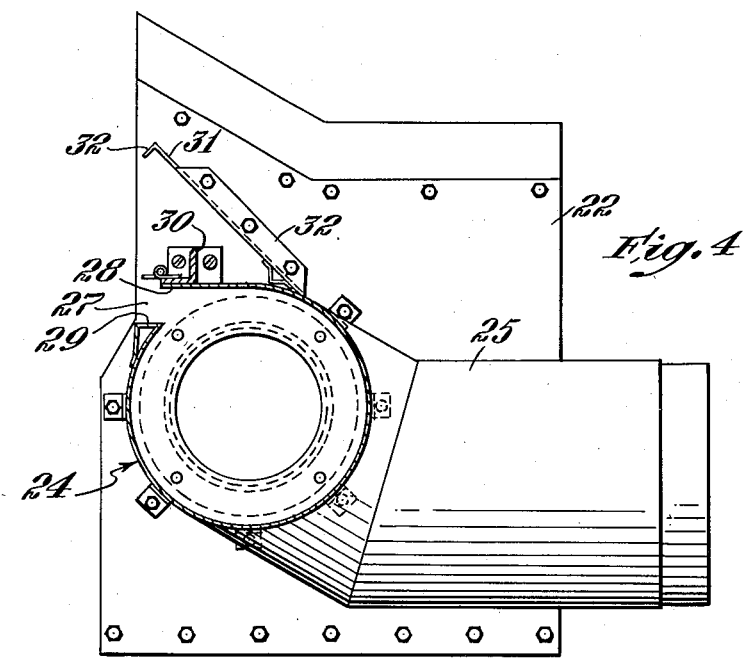
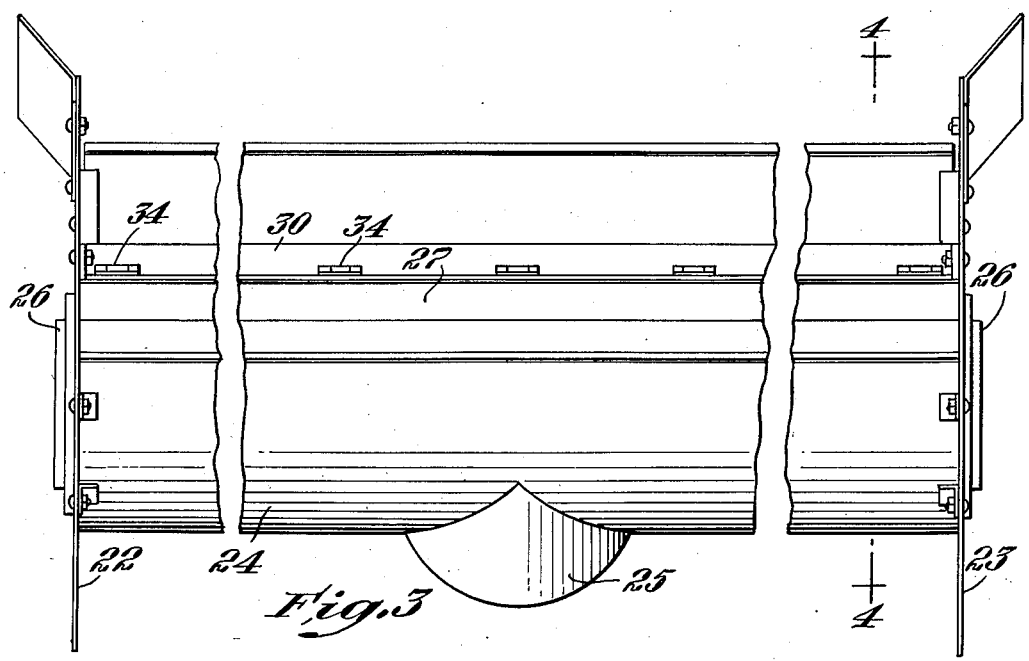
Inventor
Herman C. Graebe
by Roberts Cushman & Grover
att'ys.

Dec. 23, 1952  H. C. GRAEBE  2,622,280
PNEUMATIC LINTER GIN
Filed Dec. 23, 1949  3 Sheets-Sheet 3
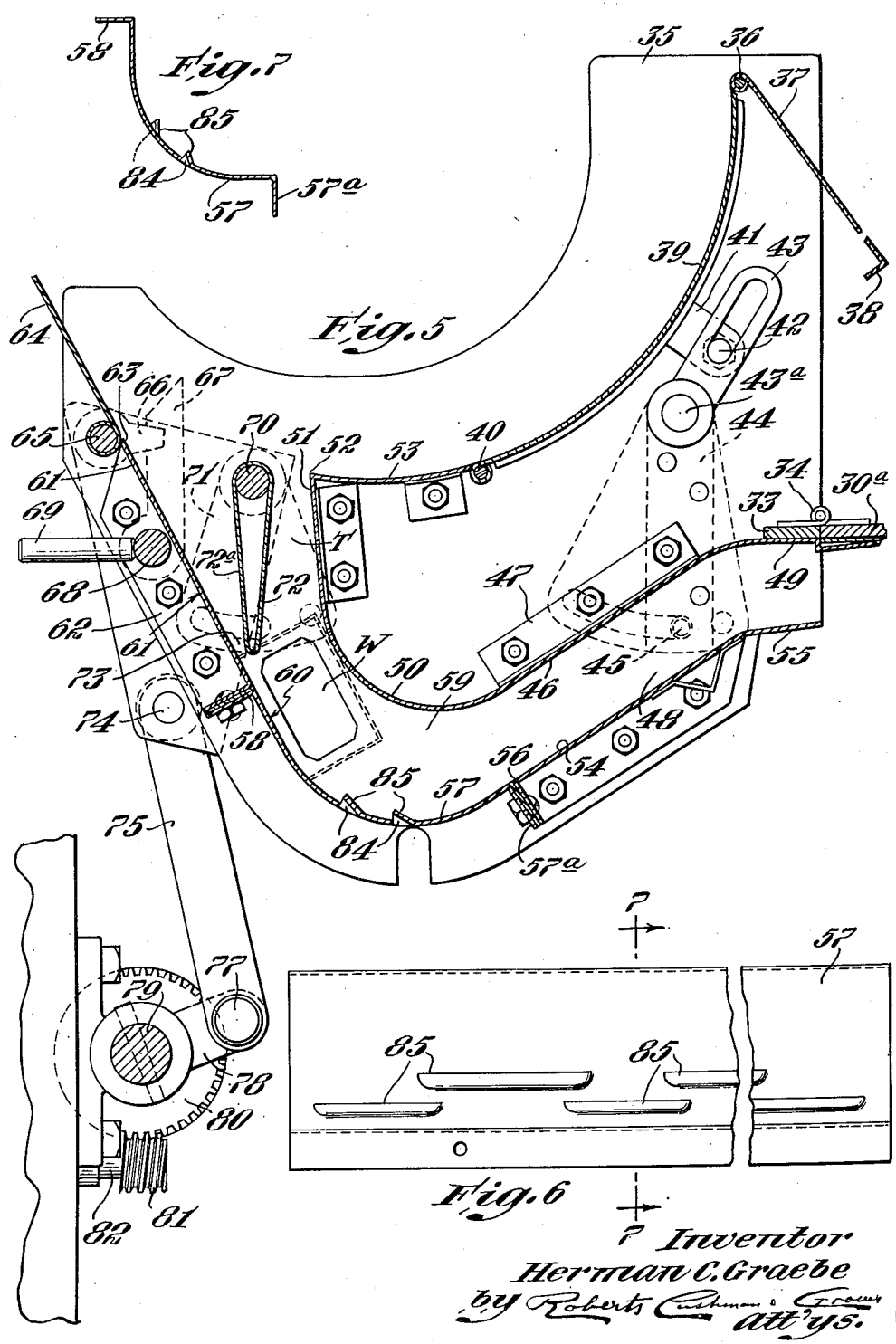
Inventor
Herman C. Graebe
by Roberts Cushman & Grover
att'ys.

Patented Dec. 23, 1952

2,622,280

UNITED STATES PATENT OFFICE 2,622,280

PNEUMATIC LINTER GIN

Herman C. Graebe, Bridgewater, Mass., assignor to The Murray Company of Texas, Inc., Dallas, Tex., a corporation of Delaware Application December 23, 1949, Serial No. 134,815

10 Claims. (Cl. 19—59)

This invention pertains to linter gins of the so-called brushless type, more particularly to a pneumatic linter having provision for overhead moting and with added provision for separating fine motes and dust from the lint prior to its delivery from the gin, the present invention constituting an improvement upon the gin described and claimed in the patent to Graebe, No. 2,433,047 dated March 16, 1948.

The linter described in the above patent effectively removes the useful lint from the saw cylinder by suction action, without recourse to an air blast nozzle or similar high pressure devices, and is so designed as to prevent useful fibers from traveling with the saw blades back to the roll box and into the slots of the grate-fall. However, it does employ gravity moting below the saw cylinder in addition to the overhead moting. Gravity moting is an exceedingly delicate operation requiring the most careful adjustment of air passages, baffles, etc.; the provision of means for gravity moting complicates the mechanism; and the proper operation of the linter requires much care on the part of the operator in order to avoid loss of useful lint.

The present invention has for one of its objects the provision of a linter gin having the desirable characteristics of the linter of the aforesaid patent, but which accomplishes the desired results without recourse to gravity moting. A further object is to provide a linter of brushless type wherein motes of appreciable mass are removed by overhead moting and wherein small motes and dust, not removed in the overhead moting, are separated from the lint bearing air current by centrifugal action. A further object is to provide a linter of brushless type wherein the small motes and dust are effectively separated from the useful lint by simple means involving a minimum of adjustments for effective operation. A further object is to provide a brushless linter having adequate provision for removing dust and fine motes without substantial loss of useful fiber and so devised that its parts are readily adjustable to compensate for wear of the saw cylinder. Other and further objects and advantages of the invention will be pointed out in the following more detailed description and by reference to the accompanying drawings wherein Fig. 1 is a fragmentary diagrammatic front-to-rear vertical section through a linter gin embodying the present invention;

Fig. 3 is a front elevation of the stationary rear portion of the lint-separating means;

Fig. 4 is a vertical section on the line 4—4 of Fig. 3;

Fig. 5 is a fragmentary, vertical section, in the same plane as that of Fig. 1, but to larger scale, showing the forward, adjustable portion of the lint-separating means;

Fig. 6 is a plan view of a part of the lint delivery conduit; and

Fig. 7 is a section on the line 6—6 of Fig. 5.

Figure 1:
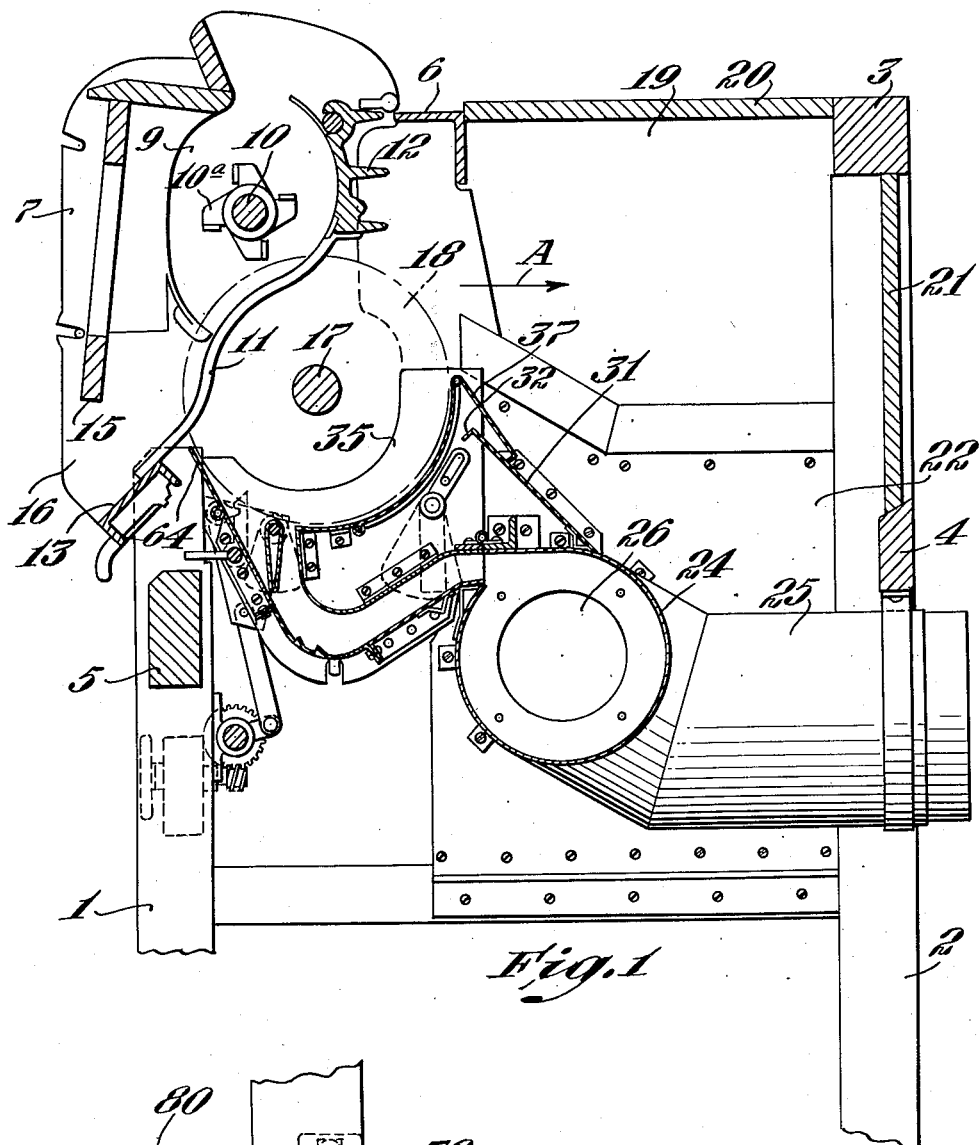

Referring to the drawings, the numerals 1 and 2 (Fig. 1) designates upright members of the frame of the apparatus, while the numerals 3, 4, 5 and 6 designate horizontal transverse members, it being understood that the frame may be constructed in any desired manner and in accordance with conventional or convenient design, thereby to support the various operative instrumentalities. The frame of the apparatus also comprises end plates 7 (of which only one is illustrated), which carry bearings for some of the operative instrumentalities, all in accordance with usual practice. The breast structure (comprising the roll box 9, in which turns the shaft 10 upon which is mounted the float roll $10^a$) is pivotally connected, in customary manner to the forward portion of the frame so that it may swing upwardly and forwardly. The breast structure also comprises the grate-bars 11, secured at their upper ends to the transverse member 12 of the roll box and at their lower ends to the seed-board 13. The breast board terminates at the point 15 and between this point and the seed-board 13 there is a space 16 for the escape of the seeds, this space also providing for the entrance of air. The saw shaft 17 is arranged to the rear of the grate-bars 11 and supports the saw cylinder 18. The overhead moting space 19 (Fig. 1) is defined at its opposite ends by the plates 7, at its top by the horizontal panel 20 and at the rear by the vertical panel 21.

Within the rear portion of the frame of the machine there is arranged a stationary unit comprising transversely spaced vertical plates 22 and 23 (Figs. 1, 3 and 4) which are parallel to the side plates 7 of the apparatus but spaced inwardly therefrom. These plates support the opposite ends of a horizontal cylindrical case 24 constituting a lint-collecting chamber, this case being closed at its opposite ends by removable plates 26 (Fig. 3). A delivery pipe 25 is connected at its forward end to the case 24 at about the middle of the latter and, as shown in Fig. 1, extends outwardly through the rear wall of the gin. This pipe 25 is connected to any suitable source of suction, for example a blower-fan, which constantly maintains a subatmospheric pressure within the case 24 and within the linter, so that air tends to flow into the linter through any open aperture, for example the opening at the point 16.

At its forward upper portion (Figs. 3 and 4) the cylindrical case 24 is provided with a transversely extending tangential inlet slot 27, defined by the substantially horizontal members 28 and 29 respectively. An angle bar 30 extends transversely across from one to the other of the plates 22 and 23, being bolted at its opposite ends to the respective plates. This angle bar 30 has a horizontal flange 30ª which overlies the part 28 and to which the latter may be secured, for example by welding or riveting.

A sheet metal member 31 (Fig. 1), having end flanges which are secured to the plates 22 and 23 respectively, extends upwardly in substantially tangential relation to the outer surface of the case 24 to a point adjacent to but spaced rearwardly from the peripheries of the saw cylinder, the part 31 being here shown as provided with a downwardly directed stiffening flange 32 at its upper end. This member 31 defines the fixed portion of the forwardly and upwardly inclined part of the floor of the overhead moting space 19.

Within the forward portion of the linter structure (Fig. 5) there is arranged a supporting unit comprising a transversely extending, horizontal bar 33 which is connected by a plurality of hinges 34 (Figs. 3 and 5) to the horizontal flange 30ª of the angle bar 30. This forward unit also comprises transversely spaced end plates 35 (but one of which is shown) to which the opposite ends of the bar 33 are fixedly secured and which are connected by other rigid, transversely extending parts as hereinafter described. One of these transversely extending parts is a rod 36 (Fig. 5) which is so located as to be very close to the periphery of the saw cylinder and substantially in the horizontal plane of the axis of the saw shaft 17. This rod 36 forms the pivotal support for the forward end of a downwardly and rearwardly inclined member 37 constituting a forward extension of the floor member 31 of the moting space. The upper end of part 37 defines the bottom edge of a mote discharge opening through which heavy motes enter the chamber 19. The member 37 is of sheet material, and extends substantially from one of the plates 35 to the other. Preferably its rear edge is bent downwardly to form a flange 38 which rides upon the upper surface of the floor member 31. This member 37 constitutes an extension of the floor 31 and being free to swing about the rod 36, preserves the continuity of the moting chamber floor regardless of the position of adjustment of the forward unit about the axis of the hinges 34.

A concave shield member 39, coaxial with the saw cylinder, is pivotally mounted at its lower edge upon a rod 40 which extends from one of the plates 35 to the other. The concave shield member 39 extends upwardly and terminates adjacent to the rod 36. Brackets 41 project rearwardly from the concave plate 39 near the opposite sides respectively of the machine and are provided with pins 42 which slide freely in elongate slots in the upper arms 43 of levers pivoted at 43ª and having downwardly directed arms 44 provided with adjusting pins 45 by means of which the levers may be held in adjusted position, thereby permitting variation of the position of the concave shield 39 to compensate for variations in the diameter of the saw cylinder, or to adjust the shield 39 in setting the machine to give optimum results.

Below the concave shield 39 there is arranged a substantially straight, transversely extending upwardly and rearwardly sloping plate 46 having flanges 47 at its opposite ends by which it is secured to the vertical end plates 35. This plate 46 forms the rear portion of the roof of a lint delivery conduit 48, the rear end of the plate 46 underlying the bar 33 as shown at 49 and being secured to the latter, for example by welding or rivets. As illustrated (Fig. 5), a rearward extension of the plate 46 projects into the slot 27 (Fig. 4) just below the member 30ª. The plate 46 has a mid-portion 50 whose under surface is convex and which constitutes the roof of a moting space 59. The forward portion of the plate 46 extends upwardly in tangential relation to its curved portion 50 to form the substantially vertical rear wall 51 of the delivery throat T. The part 51 terminates just below the periphery of the saw cylinder. A curved part 53, coaxial with the saw cylinder, extends from the point 52 to the pivot rod 40, forming in effect a stationary forward continuation of the adjustable shield 39. The parts 51 and 53 are fixedly secured at their opposite ends to the respective plates 35.

The lower or floor wall of the lint delivery conduit 48 comprises the straight, rearwardly and upwardly sloping part 54 which is substantially parallel to the part 46 and which has a rear portion 55 which overlies the lower wall 29 (Fig. 4) of the slot 27. The part 54 is secured to the opposite plates 35 and terminates at the point 56 in a downwardly directed flange to which is removably bolted a downwardly directed flange 57ª forming part of a member 57, having a concave upper surface (Figs. 5 and 7), constituting the floor of the moting space 59. The part 54 is provided at its forward edge with another downwardly directed flange 58. Preferably the curvatures of the roof and floor 57 are such that the mote separating space 59 intervening between them first gradually increases in vertical depth from its left hand end (Fig. 5) and then decreases in vertical depth as it merges with the delivery conduit 48. The floor member 57 has a straight, forward portion 60 which is tangent to its curved lower portion. This portion 60 extends upwardly and forwardly and terminates at the flange 58. An upward extension 61 of the part 60 is aligned with the latter and reaches up to a transverse pivot rod 65 which forms a pivotal support for a further upward extension 64, normally aligned with the parts 60 and 61. The pivot rod 65 is provided with rigid lugs 66 (Fig. 5) near its opposite ends which are normally engaged by latch members 67 fixed to a rocker bar 68 pivoted in bearings in the plates 35. This bar 68 is provided with a forwardly directed handle 69 by means of which it may be rocked so as to disengage the latches 67 from the lugs 66. When these parts are disengaged, it is possible to turn the extension member 64 downwardly so as to provide space for the removal of the cylinder. Normally, the extension member 64 terminates at a point just below the gratebars 11 and very close to the periphery of the saw cylinder so that there is a tendency (due to the subatmospheric pressure maintained within the linter structure) for air to enter between the periphery of the saw cylinder and the upper edge of the member 64 and to move downwardly and rearwardly in opposition to the upwardly and forwardly moving teeth of the saw at this part of the periphery of the saw cylinder.

A transverse shaft 70, mounted in bearings at its opposite ends in the plates 35, is spaced forwardly from the point 52 at which the parts 51 and 53 join, and on this rod 70 is mounted a depending baffle member comprising the rear wall 72 and the forward wall 72ª. The baffle is here shown as of sheet material and hollow and terminating in a rounded lower edge which is normally spaced, as shown at 73, from the part 61 so as to leave a narrow passage for the entrance of air between the forward wall 72ª of the baffle and the part 61. A lever arm 71, fixed at its upper end to the rod 70, is provided with an arcuate slot near its lower end for the reception of a retaining bolt. By swinging the arm 71 the width of the slot at 73 may be adjusted.

The part 51 constitutes the rear wall of a delivery throat T whose upper end is closely adjacent to the periphery of the saw cylinder and which merges at its lower end with the mote separating space 59 defined by the concave parts 50 and 57.

Figure 2:
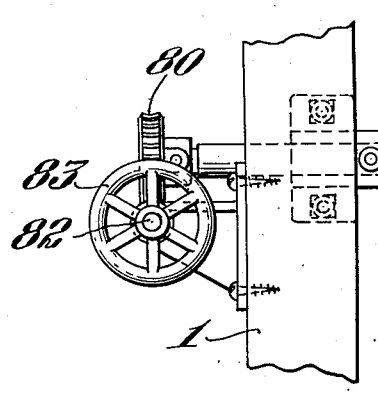
Fig. 2 is a fragmentary front elevation of the left-hand side portion of the linter, illustrating means for adjusting certain of the parts.

Pins 74 (Fig. 5), fixed in the opposite plates 35, form pivotal connections for the upper ends of links 75 whose lower ends are pivotally secured by pins 77 to lever arms 78 fixed to the opposite ends of a shaft 79 (Fig. 2) extending transversely across the machine and having bearings in the forward upright members 1 of the machine frame. This shaft extends outwardly beyond one of the uprights 1 and its outboard end is provided with a worm wheel 80 (Fig. 5) which meshes with a worm 81 on a shaft 82 which carries a hand wheel 83 (Fig. 2). By turning this hand wheel the shaft 79 is rocked, thus moving the links 75 up or down and thereby swinging the forward supporting unit about the axis of the hinges 34, so that the upper end of the throat T may be located properly with reference to the periphery of the saw cylinder as the diameter of the cylinder changes during use. As here illustrated, a glazed opening W is provided in one side or, if desired, in both sides of the chamber 59, so that the operation of the machine may be observed, thus assisting in the adjustment of the parts so as to obtain optimum results.

The suction fan, as above noted, tends to induce a flow of air into the linter through any open aperture and since the only egress for air from the vicinity of the saw cylinder is through the gap or gaps existing between the edge 52 and the sloping plate 61, all incoming air eventually finds its way into the educt passage comprising the space 59 and the conduit 48. Because of the shape of the space 59, the air flowing through this educt passage tends to press strongly against the plates 60, 57 and 54 which form the floor of the educt passage.

The floor of the educt passage is provided with one or more transversely extending, narrow slots 84 (Figs. 5 and 7) each, as here shown, provided at its rear edge with an upwardly and forwardly inclined baffle member 85. As here illustrated these baffles are integral portions of the concave floor member 57 but obviously they may be made in other ways. Preferably, as illustrated in Fig. 6, two or more series of the slots 84 are provided, the slots of adjacent series being staggered relatively.

In the operation of the machine heavy motes, leaf particles, etc., are thrown off centrifugally from the saw cylinder in the general direction of the arrow A (Fig. 1) and enter the overhead moting space 19 from which they may be removed in any suitable manner, for example by a screw conveyor (not shown) or otherwise. The useful lint and the fine motes and dust travel around with the saw cylinder, being confined by the concave members 39 and 53 until they reach the entrance to the delivery throat T. Due to the subatmospheric conditions maintained in the chamber 59 there is a powerful inflow of air into the throat T which draws away the useful lint, fine motes and dust from the periphery of the saw cylinder and down into the chamber 59. Any lint or dust which may be moving at so great a velocity as to cross, without entering the throat T, comes under the influence of the air current which is entering between the saw cylinder and the upper end of the member 64, and is caught and carried backwardly and downwardly by this air current and is delivered through the slot 73 into the chamber 59. The air current entering through the throat T also passes down into the chamber 59 and sweeps along the concave member 57 toward the lint delivery duct 48. As the air current follows the curved wall 57, centrifugal action tends to press the relatively heavy particles of dust, sand, etc., against the concave wall or floor 57 and against the floor 54 of the delivery duct, and as these particles move along in contact with the floor of the educt passage they are caught by the baffle members 85 and swept out through the slot or slots 84. The useful lint being lighter in weight than the dust particles and sand, tends to follow the shorter path along the under surface of the wall 50 and is carried out through the lint delivery conduit 48 into the chamber in the cylinder 24 and thence passes out through the pipe 25 to whatever lint-collecting means may be provided. Observation of the moving lint through the window W shows that the useful lint does tend to follow the upper wall 50 in flowing through the space 59, the relative amount of useful lint gradually decreasing toward the outer wall 57 so that very little useful lint escapes through the slots 84. If desired, some collecting means may be arranged below the slots 84, for example a removable, stationary receptacle or a screw conveyor. Since such elements form no part of the present invention they have not been illustrated.

As the diameter of the saw cylinder decreases from wear, the forward movable unit may be adjusted about the axis of the hinges 34 so as to keep the concave members 39 and 53 at the proper distance from the teeth of the rotating saw cylinder. During operation of the machine, and as the result of observation through the window W, the operator will adjust the parts 39 and 72 so as to secure the optimum results, these adjustments being very easily made while the machine is in operation.

While one desirable embodiment of the invention has been illustrated by way of example it is to be understood that the invention is broadly inclusive of any and all modifications which fall within the scope of the appended claims.

I claim:

1. In combination in a brushless linter gin of the kind wherein the lint is removed from the saw cylinder by suction means and which includes a roll box, a grate-fall, a saw cylinder, means defining a moting chamber to the rear of the saw cylinder having an entrance above the horizontal plane of the axis of the cylinder and having a floor whose forward edge is closely adjacent to the periphery of the saw cylinder, an imperforate curved shield extending downwardly and forwardly, in close adjacency to the periphery of the saw cylinder, from the forward edge of the floor of said moting chamber to a point below the saw cylinder, means defining a delivery throat extending downwardly from adjacent to the periphery of the saw cylinder, said throat having a rear wall which extends downwardly from the forward lower edge of said curved shield and which merges with a wall forming a convex roof for a moting space, means defining a lint delivery conduit in which subatmospheric pressure is maintained, said conduit having an upper wall which merges in tangent relation with the rear part of said convex roof, the conduit having a bottom wall which merges in tangent relation with a wall forming a concave floor for said moting space, the wall which forms the floor also merging with a wall which extends forwardly and upwardly substantially to the grate-fall, the floor of the moting space having a transversely elongate slot approximately at its lowest point, and a baffle blade secured to the floor at the rear edge of said slot and sloping upwardly and forwardly.

2. In combination in a brushless linter gin of the kind wherein the lint is removed from the saw cylinder by suction means and which has a roll box, a grate-fall, a saw cylinder, means defining a moting chamber to the rear of the saw cylinder whose entrance is above the horizontal plane of the axis of the cylinder and which has a floor whose forward edge is closely adjacent to the periphery of the saw cylinder, an imperforate curved shield extending downwardly in close adjacency to the periphery of the saw cylinder from the forward edge of the floor of said moting space to a point below the saw cylinder, means defining a delivery throat extending downwardly from adjacent the periphery of the saw cylinder, said throat having a rear wall which extends down from the forward, lower edge of said curved shield, means defining an educt passage in which subatmospheric pressure is maintained, said passage having a curved, downwardly convex portion, the rear wall of the delivery throat being tangent to the roof of the curved portion of the educt passage, the floor of the curved portion of the educt passage having transversely elongate slots arranged in staggered relation, and a baffle blade extending upwardly and forwardly from the rear edge of each slot.

3. In combination, in a brushless linter gin of the kind wherein the lint is removed from the saw cylinder by suction means and which has a roll box, a grate-fall, a saw cylinder, means defining a moting chamber to the rear of the saw cylinder whose entrance is above the horizontal plane of the axis of the cylinder and which has a floor whose forward edge is closely adjacent to the periphery of the saw cylinder, an imperforate curved shield extending downwardly in close adjacency to the periphery of the saw cylinder from the forward edge of the floor of said moting space to a point below the saw cylinder, means defining a delivery throat extending downwardly from adjacent the periphery of the saw cylinder and having a rear wall which extends down from the forward lower edge of said curved shield, means defining an educt passage having a curved portion with which the lower end of the throat merges, a frame constituting a support for the means which defines the rear wall of the delivery throat and the curved portion of the educt passage, means pivotally supporting the frame at a point spaced below the forward edge of the floor of the moting chamber, a rotary, horizontal shaft at the front of the linter, arms fixed to the shaft, a link connecting each arm to the pivoted frame, and means for turning the shaft thereby to rock the frame up and down about its pivotal support.

4. In combination, in a pneumatic linter gin of the brushless type having a roll box, grate-fall, saw cylinder, and an educt passage leading downwardly from the lower part of the periphery of the saw cylinder and wherein subatmospheric pressure is maintained thereby to provide an air current for sweeping the lint from off the saws, means for removing heavy motes at a point above the horizontal plane of the axis of the saw cylinder, the educt passage comprising an arcuate portion having a curved outer wall, said wall having a parallel series of narrow, transversely extending slots, the slots of adjacent series being staggered, and a baffle at the forward edge of each slot.

5. In combination in a brushless linter gin of the kind wherein the lint is removed from the saw cylinder by suction means and which includes a roll box, a grate-fall, a saw cylinder, means defining a moting chamber to the rear of the saw cylinder having an entrance above the horizontal plane of the axis of the cylinder and having a floor whose forward edge is closely adjacent to the periphery of the saw cylinder, an imperforate, curved shield extending downwardly and forwardly, in close adjacency to the periphery of the saw cylinder, from the forward edge of the floor of said moting chamber to a point below the saw cylinder, means defining a delivery throat extending downwardly from adjacent to the periphery of the saw cylinder, means defining an educt passage with which the lower part of the throat merges and where in subatmospheric pressure is maintained thereby to create an air current for sweeping the lint from off the saws, the educt passage having a floor comprising a forward portion which slopes downwardly and rearwardly, a mid-portion whose upper surface is concave and a rear substantially straight portion, said floor being smoothly continuous except for a plurality of narrow, transversely extending mote delivery ports, the educt passage having a roof having a convex lower surface disposed directly above the concave portion of the floor and having a rear, substantially straight portion which is approximately parallel with the rear portion of the floor, and a baffle blade inclined upwardly and forwardly from the rear edge of each such mote delivery port.

6. In combination in a brushless linter gin of the kind wherein the lint is removed from the saw cylinder by suction means and which includes a roll box, a grate-fall, a saw cylinder, means defining a moting chamber to the rear of the saw cylinder having an entrance above the horizontal plane of the axis of the cylinder and having a floor whose forward edge is closely adjacent to the periphery of the saw cylinder, an imperforate curved shield extending downwardly and forwardly, in close adjacency to the periphery of the saw cylinder, from the forward edge of the floor of said moting chamber to a point below the saw cylinder, means defining a delivery throat extending downwardly from adjacent to the periphery of the saw cylinder, means defining an educt passage with which the throat merges and wherein subatmospheric pressure is maintained thereby to create an air current for sweeping the lint from off the saws, the educt passage having a floor and a roof so shaped as to provide a downwardly convex moting space and a substantially straight lint delivery conduit, means continuing said floor substantially to the grate-fall, the floor having at least one narrow, transversely extending delivery aperture through which motes are ejected, and a baffle blade extending upwardly and forwardly from the rear edge of each such aperture.

7. In combination in apparatus for removing cotton from its seed of the kind wherein the lint is removed from the saw cylinder by suction means and which includes a roll box, a grate-fall, a saw cylinder, means defining an overhead moting chamber to the rear of the saw cylinder, said chamber having an entrance whose lower edge is defined by a part which is closely adjacent to the periphery of the saw cylinder and approximately at the level of the axis of the saw cylinder, an imperforate curved shield extending downwardly and forwardly in close adjacency to the periphery of the saw cylinder from said lower edge of the entrance to the overhead moting chamber to a point below the saw cylinder, means defining a delivery throat extending downwardly from adjacent to the periphery of the saw cylinder, means defining a mote-separating space with which the throat merges and wherein subatmospheric pressure is maintained thereby creating an air current for sweeping the lint from the saws, said mote-separating space having a floor and a roof and communicating with a substantially straight lint delivery conduit which has upper and lower walls, the upper surface of the floor of the mote-separating space comprising a concave portion which merges with the lower wall of the lint delivery conduit, means continuing the floor of the moting space substantially to the grate-fall, said floor having a narrow, transversely extending delivery aperture through which motes are ejected, and a baffle blade extending upwardly and forwardly from the rear edge of said aperture.

8. In combination in a brushless linter gin of the kind wherein the lint is removed from the saw cylinder by suction means and which includes a roll box, a grate-fall and a saw cylinder, means defining a moting chamber to the rear of the saw cylinder and having a floor whose forward edge is closely adjacent to the periphery of the saw cylinder and in a horizontal plane adjacent to the horizontal plane of the axis of the saw cylinder, an impervious curved shield extending downwardly and forwardly in close adjacency to the periphery of the saw cylinder from the forward edge of the floor of said moting chamber to a point below the saw cylinder, means defining a mote-separating chamber disposed immediately beneath the saw cylinder and which communicates with a space in which subatmospheric pressure is maintained by the suction means thereby to create an air current for sweeping the lint from the saws, the mote-separating chamber having a floor comprising a straight rear portion and a curved portion which is tangent to said straight portion and whose upper surface is concave, means defining a delivery throat extending downwardly from adjacent to the periphery of the saw cylinder and into the mote-separating chamber, the parts being so constructed and arranged that air, passing down through the throat into said chamber impinges upon and is deflected by said concave surface and caused to sweep along the straight rear portion of said floor, the floor of the mote-separating chamber having a transversely extending narrow delivery port through which motes carried by the air current, sweeping along the floor of the chamber, are centrifugally ejected, and a baffle blade extending upwardly and forwardly from the rear edge of said aperture.

9. In combination in a brushless linter gin of the kind wherein the lint is removed from the saw cylinder by suction means and which includes a roll box, a grate-fall, a saw cylinder, means defining a moting chamber to the rear of the saw cylinder and having a floor whose forward edge is closely adjacent to the periphery of the saw cylinder and in a horizontal plane adjacent to the horizontal plane of the axis of the saw cylinder, an impervious curved shield extending downwardly and forwardly in close adjacency to the periphery of the saw cylinder from the forward edge of the floor of said moting chamber to a point below the saw cylinder, means defining a delivery throat extending downwardly from adjacent to the lower portion of the periphery of the saw cylinder, means defining a passage into which the delivery throat discharges, said passage having a wall comprising a curved portion and a straight portion, the curved portion being constructed and arranged to cause air entering the passage from the delivery throat to be deflected through an arc of approximately 90° thereby creating centrifugal force which presses entrained dust and other heavy particles against said wall, said wall having a transversely extending, narrow delivery port through which motes, carried by the air current sweeping along said wall, are ejected, and a baffle blade extending upwardly and forwardly from the rear edge of said aperture.

10. Apparatus for separating heavier discrete particles from lint entrained in an air current flowing from a linter gin, said apparatus comprising a passage having spaced inner and outer walls, the passage communicating with a space in which subatmospheric pressure is maintained thereby causing air to flow through the passage, the passage having a bend of the order of 90° of arc at a point intermediate its ends whereby the heavier particles suspended in the air current are centrifugally pressed against the outer wall of the passage in said bend, said outer wall having a transverse slot so located that the heavier particles swept along by the air current in contact with said outer wall are tangentially ejected through the slot while the lighter lint continues on with the air current past the slot, and an inclined baffle blade extending forwardly and toward the on-coming air current from the rear edge of the slot.

HERMAN C. GRAEBE.

REFERENCES CITED

The following references are of record in the file of this patent:

UNITED STATES PATENTS

| Number | Name | Date |
|---|---|---|
| 552,382 | Lumpkin et al. | Dec. 31, 1895 |
| 632,685 | Thomas | Sept. 5, 1899 |
| 970,482 | Fallon | Sept. 20, 1910 |
| 1,203,739 | Hodo | Nov. 7, 1916 |
| 2,310,598 | Ricker | Feb. 9, 1943 |
| 2,372,796 | Rogers et al. | Apr. 3, 1945 |
| 2,438,047 | Graebe | Mar. 16, 1948 |